United States Patent [19]

Tanaka et al.

[11] Patent Number: 5,363,356
[45] Date of Patent: Nov. 8, 1994

[54] TRACKING APPARATUS FOR OPTICAL DISK AND TRACKING METHOD OF THE SAME WITH TRACKING POLARITY INVERTOR RESPONSIVE TO DISK TYPE

[75] Inventors: Satoru Tanaka; Shuichi Yangisawa; Fumio Matsui, all of Saitama, Japan

[73] Assignee: Pioneer Electronic Corporation, Tokyo, Japan

[21] Appl. No.: 158,915

[22] Filed: Nov. 29, 1993

[30] Foreign Application Priority Data

Nov. 30, 1992 [JP] Japan .................................. 4-320635

[51] Int. Cl.⁵ .............................................. G11B 7/095
[52] U.S. Cl. .............................. 369/44.29; 369/44.34; 369/58
[58] Field of Search ............... 369/44.25, 44.26, 44.29, 369/44.31, 44.34, 44.35, 44.39, 54, 58

[56] References Cited

U.S. PATENT DOCUMENTS 5,042,020 8/1991 Endo ................................ 369/44.31
5,056,075 10/1991 Maruta et al. .................... 369/44.29

Primary Examiner—W. R. Young
Attorney, Agent, or Firm—Kane, Dalsimer, Sullivan, Kurucz, Levy, Eisele and Richard

[57] ABSTRACT

A tracking apparatus for an optical disk, which has a pit array along a predetermined track, is provided with: an optical pickup for irradiating a light beam to the optical disk, and receiving a light modulated and reflected by the optical disk; a tracking error signal generating circuit for generating a tracking error signal on the basis of an output signal of the optical pickup; a tracking servo circuit for making the light beam follow the pit array when a polarity of the tracking error signal changes; a comparing circuit for comparing an amplitude of a first RF signal, which is output from the optical pickup when the polarity of the tracking error signal changes from a first polarity to a second polarity which is reverse to the first polarity, and an amplitude of a second RF signal, which is output from the optical pickup when the polarity of the tracking error signal changes from the second polarity to the first polarity, with each other; and a tracking polarity inverting circuit for selectively inverting a tracking polarity of the tracking servo circuit on the basis of a comparison result of the comparing circuit.

11 Claims, 3 Drawing Sheets

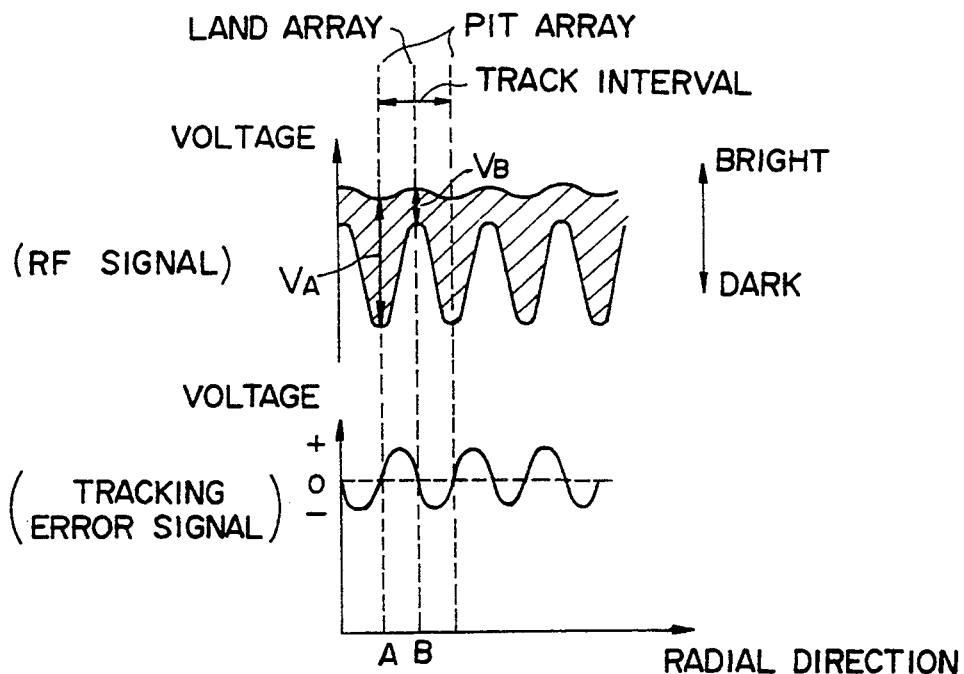
FIG. 3 RELATIONSHIP BETWEEN RF SIGNAL AND TRACKING ERROR SIGNAL, IN ORDINARY LD
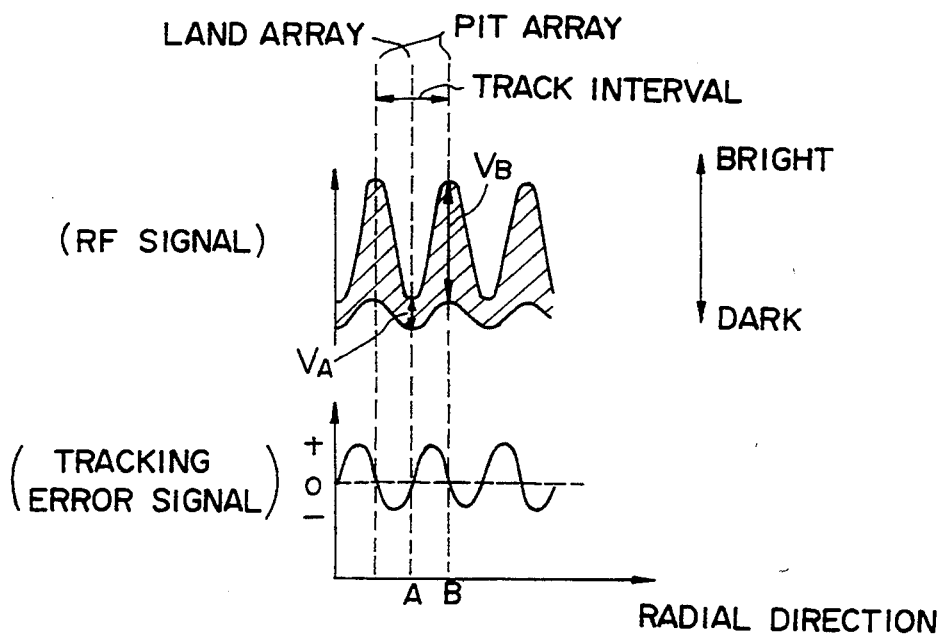
FIG. 4 RELATIONSHIP BETWEEN RF SIGNAL AND TRACKING ERROR SIGNAL, IN R-LD

TRACKING APPARATUS FOR OPTICAL DISK AND TRACKING METHOD OF THE SAME WITH TRACKING POLARITY INVERTOR RESPONSIVE TO DISK TYPE

BACKGROUND OF THE INVENTION

1. Field of the Invention

The present invention is related with a tracking apparatus for an optical disk, and more particularly, it is related with a tracking apparatus, which makes a light beam follow a pit array of the optical disk.

2. Description of the Related Art

An optical disk player, for example, a laser disk (LD) player, reads information recorded on a LD by irradiating a light beam to the LD and receiving the reflected light which is modulated by the LD.

The light beam is made to follow the pit array in case of optically reading the pit array on the disk in the above-mentioned LD player, so that a tracking control is performed.

In this tracking control, a tracking error signal is generated on the basis of the reflected light from the disk. The light beam is made to follow the pit array at a zero-crossing point when the polarity of the tracking error signal changes from minus (−) to plus (+) (or when the polarity of the tracking error signal changes from plus (+) to minus (−), depending on the polarity characteristic of the tracking error signal generating circuit).

In an ordinary LD to which the information is recorded beforehand, the intensity of the reflected light is low at the pit array of the disk, while the intensity of the reflected light is high between the pit arrays of the disk. Accordingly, it becomes possible to make the light beam follow the pit array at the zero-crossing point when the tracking error signal changes from minus (−) to plus (+), as mentioned above.

Apart from that, there is a recordable LD (it is referred as a R-LD, hereinbelow), to which recording is arbitrarily enabled according to a demand of a user. In the R-LD in which the phthalocyanine dye, for example, is used as a recording layer, the intensity of the reflected light is high at the pit array of the disk, while the intensity of the reflected light is low between the pit arrays of the disk, on the contrary to the aforementioned ordinary LD. Thus, the light beam cannot be made to follow the pit array at the zero crossing point when the tracking error signal changes from minus (−) to plus (+). But, it is necessary to make the light beam follow the pit array at the zero crossing point when the tracking error signal changes from plus (+) to minus (−).

In this manner, the tracking polarity at the time of tracking control of this R-LD type is reverse to that of the ordinary LD. Consequently, there is a problem that the R-LD cannot be reproduced by a player for the ordinary LD. Instead, the R-LD requires an exclusive player to deal with the reverse tracking polarity.

SUMMARY OF THE INVENTION

It is therefore an object of the present invention to provide a tracking apparatus and a tracking method, which can reproduce an optical disk by a same player irrespective of the kind of optical disk.

The above object of the present invention can be achieved by a tracking apparatus for an optical disk, which has a pit array along a predetermined track. The tracking apparatus is provided with: an optical pickup for irradiating a light beam to the optical disk, and receiving a light modulated and reflected by the optical disk; a tracking error signal generating circuit for generating a tracking error signal on the basis of an output signal of the optical pickup; a tracking servo circuit for making the light beam follow the pit array when a polarity of the tracking error signal changes; a comparing circuit for comparing an amplitude of a first RF signal, which is output from the optical pickup when the polarity of the tracking error signal changes from a first polarity to a second polarity which is reverse to the first polarity, and an amplitude of a second RF signal, which is output from the optical pickup when the polarity of the tracking error signal changes from the second polarity to the first polarity, with each other; and a tracking polarity inverting circuit for selectively inverting a tracking polarity of the tracking servo circuit on the basis of a comparison result of the comparing circuit.

According to the present invention, the amplitude of the first RF signal, which is output from the optical pickup when the polarity of the tracking error signal changes from the first polarity to the second polarity, and the amplitude of the second RF signal, which is output from the optical pickup when the polarity of the tracking error signal changes from the second polarity to the first polarity, are compared with each other. Then, the tracking polarity of the tracking-servo circuit is inverted on the basis of the comparison result.

The operation of the present invention as for the cases where the optical disk is the ordinary LD, and where the optical disk is the R-LD, for example, will be explained here.

Firstly, in case of the ordinary LD, the first RF signal is greater than the second RF signal. Based on this comparison result, the tracking-servo circuit is set in the normal tracking polarity (i.e. set in a state to make the light beam follow the pit array at the zero crossing when the polarity of the tracking error signal changes from minus (−) to plus (+), for example).

On the contrary, in case of the R-LD, the first RF signal is less than the second RF signal. Based on this comparison result, the tracking-servo circuit is inverted in its tracking polarity (i.e. inverted into a state to make the light beam follow the pit array at the zero crossing point when the tracking error signal changes from plus (+) to minus (−), for example).

In this manner, the tracking-servo circuit makes the light beam follow the pit array of the optical disk by the normal tracking polarity or the inverted tracking polarity, depending on whether the optical disk is the ordinary LD or the R-LD.

According to the present invention, the above object can be also achieved by a tracking method in a tracking apparatus for an optical disk, which has a pit array along a predetermined track. The tracking method includes the steps of: irradiating a light beam to the optical disk by an optical pickup; receiving a light, which is modulated and reflected by the optical disk, by the optical pickup; generating a tracking error signal on the basis of an output signal of the optical pickup; making the light beam follow the pit array when a polarity of the tracking error signal changes, by a tracking servo circuit; comparing an amplitude of a first RF signal, which is output from the optical pickup when the polarity of the tracking error signal changes from a first polarity to a second polarity which is reverse to the first polarity, and an amplitude of a second RF signal, which is output from the optical pickup when the polarity of the tracking error signal changes from the second polarity to the first polarity, with each other; and selectively inverting a tracking polarity of the tracking servo circuit on the basis of a comparison result of the comparing step.

According to the tracking method of the present invention, the tracking-servo circuit makes the light beam follow the pit array of the optical disk by the normal tracking polarity or the inverted tracking polarity, depending on whether the optical disk is the ordinary LD or the R-LD.

In this manner, according to the tracking apparatus and the tracking method of the present invention, an optical disk can be reproduced by a same player irrespective of the kind of optical disk (the ordinary LD or the R-LD etc.).

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram showing a relationship between the RF signal and the tracking error signal in the ordinary LD; and FIG. 4 is a diagram showing a relationship between the RF signal and the tracking error signal in the R-LD.

DETAILED DESCRIPTION OF THE PREFERRED EMBODIMENT

Nextly, the preferred embodiment of the present invention will be explained on the basis of the drawings.

FIG. 3 shows the relationship between a RF (Radio Frequency) signal and a tracking error signal in case of the ordinary LD.

If the optical pickup is moved in the radial direction in a condition where the tracking servo is opened, the tracking error signal and the RF signal shown in FIG. 3, are obtained. In case of the ordinary LD signal, the intensity of the reflected light is low at the pit array (radial direction position A) of the disk, while the intensity of the reflected light is high between the pit arrays, i.e. the land portion (radial direction position B) of the disk. For this reason, if the tracking servo is closed at the zero-crossing point (position A) when the polarity of the tracking error signal changes from minus (−) to plus (+), the light beam can be made to follow the pit array.

Nextly, FIG. 4 shows the relationship between the RF signal and the tracking error signal in case of the R-LD. If the optical pickup is moved in the radial direction in a condition where the tracking servo is opened, the waveforms of the tracking error signal and the RF signal shown in FIG. 4, are obtained. Here, the R-LD consists of the disk substrate and a recording layer disposed on the surface of the disk substrate. A pit array is formed on the disk substrate along the track which the light beam should be made to follow. The recording layer is constituted so that the information is recorded when the light beam is irradiated thereto. As the material of such a recording layer, for example, phthalocyanine dye is used. The phthalocyanine dye is expressed by the following expressions.

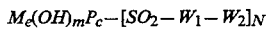

$$M_e(OH)_m P_c - [SO_2 - W_1 - W_2]_N$$

(m=1,2 n=0,1,2,3,4,5)

wherein M, is Si, Ga, Ge, V, Cu, Al, Co, Sn or none; $P_c$ is phthalocyanine ring; and $W_1$, $W_2$ is alkyl group, alkoxy group or nitrogen-containing alkyl group.

In case of the R-LD which uses this phthalocyanine dye as the material for the recording layer, the intensity of the reflected light is high at the pit array (radial direction position B) which is the recording portion of the disk, while the intensity of the reflected light is low between the pit arrays i.e. the land portion (radial direction position A) of the disk on the contrary to the case of the aforementioned ordinary LD shown in FIG. 3. For this reason, by closing the tracking servo at the zero crossing point (position B) when the polarity of the tracking error signal changes from plus (+) to minus (−), it becomes possible to make the light beam follow the pit array, so that the tracking control can be performed.

As mentioned above, in case of the R-LD, it is understood that the polarity of the tracking error signal by which a tracking servo should be closed, is reverse to the ordinary LD.

Figure 1:
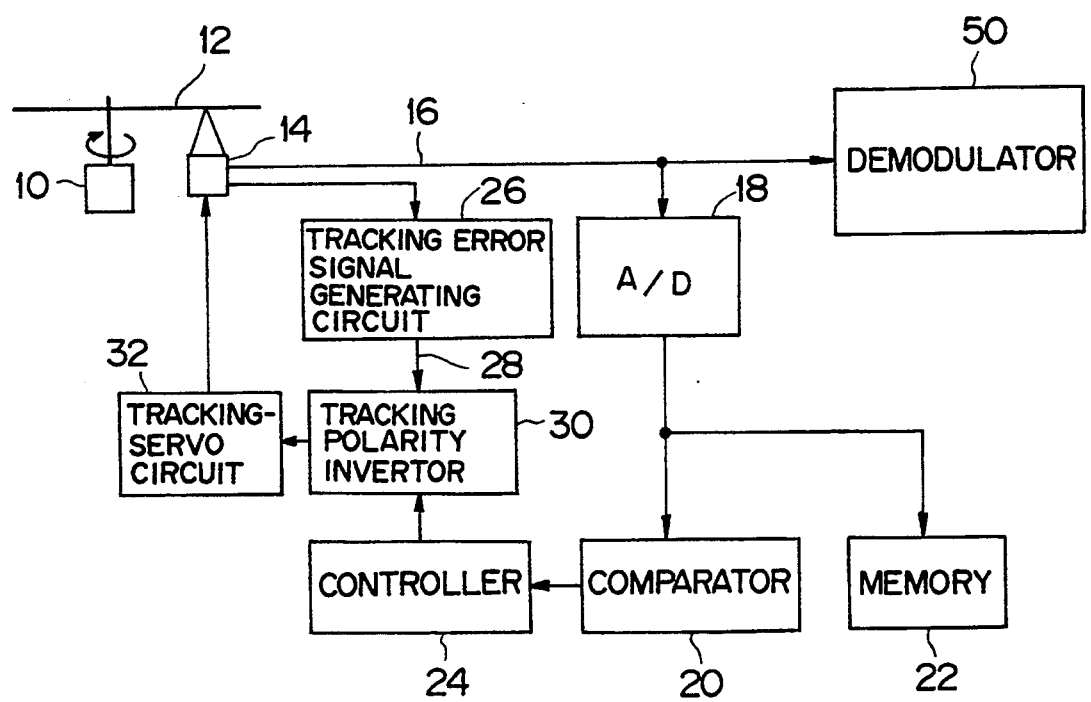
FIG. 1 is a block diagram showing a tracking apparatus as an embodiment according to the present invention.
Figure 2:
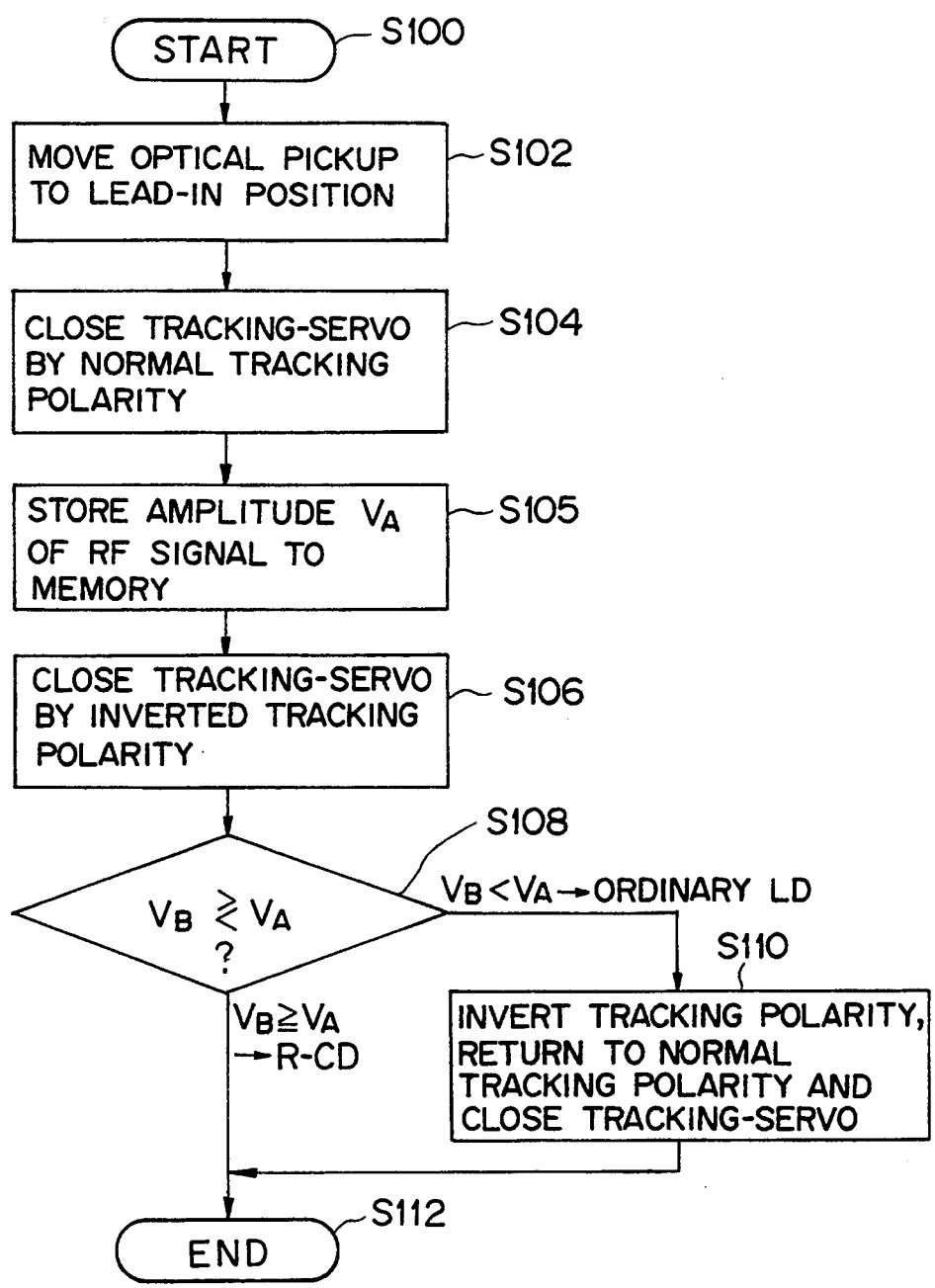
FIG. 2 is a flow chart showing an operation of the embodiment of the present invention.

Nextly, FIG. 1 shows a block diagram of the tracking apparatus as the embodiment of the present invention. FIG. 2 shows a flow chart of the operation of the embodiment.

In FIG. 1, the tracking apparatus is provided with a spindle motor 10, an optical pickup 14, and an A/D-convertor 18, a comparator 20, a memory 22, a controller 24, a tracking error signal generating circuit 26, a tracking polarity invertor 30 and a tracking-servo circuit The spindle motor 10 rotates an optical disk 12 as indicated by an arrow in the figure. There is disposed the optical pickup 14 under the optical disk 12. The optical pickup 14 is constituted to reciprocate in the radial direction of the optical disk 12. The optical pickup 14 irradiates the light beam to the optical disk 12. And, the optical pickup 14 receives the reflected light modulated by the optical disk 12, and outputs a RF signal 16. This RF signal 16 is supplied to a demodulator 50, and is also supplied to the A/D-convertor 18. The output signal from the A/D-convertor 18 is supplied to one input terminal of the comparator 20, and is also supplied to another input terminal of the comparator 20 through the memory 22. The comparison output from the comparator 20 is supplied to the controller 24.

The output signal from the optical pickup 14 is supplied to the tracking error signal generating circuit 26. The tracking error signal 28 from the generating circuit 26 is supplied to the tracking polarity invertor 30. The invertor 30 may consist of an operation amplifier. When the state or polarity of the tracking error signal changes, the tracking-servo circuit 32 makes the light beam of the optical pickup 14 follow the pit array of the optical disk 12. Under the control of the controller 24, the tracking polarity invertor 30 inverts the tracking polarity of the tracking-servo circuit 32.

Hereinbelow, the RF signal and the operation of the tracking apparatus will be explained with referring to FIGS. 1 to 3.

Firstly, the case of the ordinary LD of FIG. 3 will be explained.

At a step S100 of FIG. 2, the operation to set the tracking polarity by the tracking apparatus starts. At a step S102, the optical pickup 14 is moved to the lead-in position (the TOC (Table of Content) position in case of a CD (Compact Disk), for example) of the optical disk 12. The tracking servo-control is closed by the normal tracking polarity i.e. at the zero crossing when the tracking polarity changes (−) to (+), at a step S104. The amplitude $V_A$ of the RF signal is stored to the memory 22 at a step S105. Namely, the amplitude $V_B$ of the RF signal in the radial direction position B in FIG. 3 is obtained.

At a step S106, the tracking servo-control is closed by the inverted tracking polarity i.e. at the zero crossing when the tracking polarity changes (+) to (−).

At a step S108, the amplitude $V_B$ of the present RF signal obtained after the step S106, and the amplitude $V_A$ of the RF signal stored in the memory 22 at the step S105, are compared with each other, by the comparator 20. The comparison output from the comparator 20 is supplied to the controller 24. As shown in FIG. 3, in case of the ordinary LD, the comparison result is "$V_B < V_A$". Thus, a process proceeds to a step S110. At the step S110, the tracking polarity invertor 30 inverts the tracking polarity of the tracking-servo circuit 32, so that the polarity is returned to the normal tracking polarity. Then, the tracking servo is closed, the process proceeds to a step S112 and the operation to set the tracking polarity is ended.

Nextly, it will be explained as for the case of the R-LD of FIG. 4.

The process is proceeded from the step S100 to the step S106 in the same manner as the above explained case of the ordinary LD. However, at the step S108, in case of the R-LD, the comparison result is "$V_B \geq V_A$", as shown in FIG. 4. Thus, a process directly proceeds to the step S112 and the operation to set the tracking polarity is ended without further processing. In this case, the condition is such that the tracking polarity of the tracking-servo circuit 32 is inverted at the step S106. Thus, this inverted tracking polarity is maintained.

As mentioned above, in the present embodiment, the amplitude $V_B$ of the present RF signal, and the amplitude $V_A$ of the RF signal in the memory 22, are compared with each other. In case that "$V_B < V_A$", the optical disk 12 is judged to be the ordinary LD, so that the tracking-servo circuit 32 is made to be in the normal tracking polarity. On the contrary, in case that "$V_B \geq V_A$", the optical disk 12 is judged to be the R-LD, so that the tracking-servo circuit 32 is made to be in the inverted tracking polarity.

As described above in detail, in the present embodiment, two RF signals when the state or polarity of the tracking error signal changes, are compared with each other, and the tracking polarity of the tracking-servo circuit is switched over depending on the comparison result. Thus, irrespective of the kind of optical disk, the light beam can be made to follow the pit array of the optical disk, so that both of the ordinary LD and the R-LD can be reproduced easily by one same player.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A tracking apparatus for an optical disk, which has a pit array along a predetermined track, comprising:
   an optical pickup for irradiating a light beam to said optical disk, and receiving a light modulated and reflected by said optical disk;
   a tracking error signal generating circuit for generating a tracking error signal on the basis of an output signal of said optical pickup;
   a tracking servo circuit for making the light beam follow the pit array when a polarity of the tracking error signal changes;
   a comparing circuit for comparing an amplitude of a first RF signal, which is output from said optical pickup when the polarity of the tracking error signal changes from a first polarity to a second polarity which is reverse to the first polarity, and an amplitude of a second RF signal, which is output from the optical pickup when the polarity of the tracking error signal changes from the second polarity to the first polarity, with each other; and
   a tracking polarity inverting circuit for selectively inverting a tracking polarity of said tracking servo circuit on the basis of a comparison result of said comparing circuit.

2. A tracking apparatus according to claim 1, wherein said comparing circuit comprises:
   a memory for storing the first RF signal; and
   a comparator for comparing a RF signal presently output from said optical pickup as the second RF signal and the first RF signal stored in the memory, with each other.

3. A tracking apparatus according to claim 2, wherein said comparing circuit further comprises an A/D (Analogue to Digital) convertor for converting an analogue output signal of said optical pickup to a digital signal, and supplying the converted digital signal to the memory and the comparator.

4. A tracking apparatus according to claim 1, wherein said tracking polarity inverting circuit is coupled between said tracking error signal generating circuit and said tracking servo circuit, for receiving the tracking error signal and supplying selectively one of the tracking error signal and an inverted tracking error signal to said tracking servo circuit, depending on the comparison result of said comparing circuit.

5. A tracking apparatus according to claim 1, wherein said tracking polarity inverting circuit inverts the tracking polarity of said tracking servo circuit when the second RF signal is greater than the first RF signal according to the comparison result, and does not invert the tracking polarity of said tracking servo circuit when the second RF signal is not greater than the first RF signal 6. A tracking method in a tracking apparatus for an optical disk, which has a pit array along a predetermined track, said tracking method comprising the steps of:
   irradiating a light beam to said optical disk by an optical pickup;
   receiving a light, which is modulated and reflected by said optical disk, by said optical pickup;
   generating a tracking error signal on the basis of an output signal of said optical pickup;

making the light beam follow the pit array when a polarity of the tracking error signal changes, by a tracking servo circuit;

comparing an amplitude of a first RF signal, which is output from said optical pickup when the polarity of the tracking error signal changes from a first polarity to a second polarity which is reverse to the first polarity, and an amplitude of a second RF signal, which is output from said optical pickup when the polarity of the tracking error signal changes from the second polarity to the first polarity, with each other; and selectively inverting a tracking polarity of said tracking servo circuit on the basis of a comparison result of the comparing step.

7. A tracking method according to claim 6, wherein said comparing step comprises:

storing the first RF signal to a memory; and comparing a RF signal presently output from the optical pickup as the second RF signal and the first RF signal stored in the memory, with each other by a comparator.

8. A tracking method according to claim 7, wherein said comparing step further comprises the step of converting an analogue output signal of said optical pickup to a digital signal, and supplying the converted digital signal to the memory and the comparator.

9. A tracking method according to claim 6, wherein said tracking polarity inverting step comprises the steps of:

receiving the tracking error signal; and supplying selectively one of the tracking error signal and an inverted tracking error signal to said tracking servo circuit, depending on the comparison result of the comparing step.

10. A tracking method according to claim 6, wherein said tracking polarity inverting step comprises the step of inverting the tracking polarity of said tracking servo circuit when the second RF signal is greater than the first RF signal according to the comparison result, and does not invert the tracking polarity of said tracking servo circuit when the second RF signal is not greater than the first RF signal.

11. A tracking method according to claim 6, further comprising the step of moving the optical pickup to a lead-in position of the optical disk before the comparing step.

* * * * *